United States Patent
Godager

(10) Patent No.: US 8,169,854 B2
(45) Date of Patent: May 1, 2012

(54) SYSTEM AND METHOD FOR WIRELESS DATA TRANSMISSION

(75) Inventor: Øyvind Godager, Stavern (NO)

(73) Assignee: Well Technology AS, Stavanger (NO)

( * ) Notice: Subject to any disclaimer, the term of this patent is extended or adjusted under 35 U.S.C. 154(b) by 1221 days.

(21) Appl. No.: 11/577,019

(22) PCT Filed: Oct. 11, 2005

(86) PCT No.: PCT/NO2005/000375
§ 371 (c)(1),
(2), (4) Date: Aug. 24, 2007

(87) PCT Pub. No.: WO2006/041308
PCT Pub. Date: Apr. 20, 2006

(65) Prior Publication Data
US 2007/0296606 A1 Dec. 27, 2007

(30) Foreign Application Priority Data
Oct. 12, 2004 (NO) .................................. 20044338

(51) Int. Cl.
*E21B 47/18* (2012.01)
(52) U.S. Cl. ....................................... 367/83; 340/854.3
(58) Field of Classification Search .............. 367/82–83; 340/854.3
See application file for complete search history.

(56) References Cited

U.S. PATENT DOCUMENTS

| | | | |
|---|---|---|---|
| 3,970,877 A | 7/1976 | Russell et al. | |
| 4,078,620 A | 3/1978 | Westlake et al. | |
| 5,150,333 A | 9/1992 | Scherbatskoy | |
| 5,586,084 A | 12/1996 | Barron et al. | |
| 5,691,712 A | 11/1997 | Meek et al. | |
| 6,253,847 B1 | 7/2001 | Stephenson | |
| 6,760,275 B2 * | 7/2004 | Carstensen | 367/83 |

FOREIGN PATENT DOCUMENTS

| | | |
|---|---|---|
| EP | 0140788 A2 | 5/1985 |
| WO | 02059459 A1 | 8/2002 |

* cited by examiner

*Primary Examiner* — Albert Wong
(74) *Attorney, Agent, or Firm* — Duane Morris LLP

(57) ABSTRACT

The invention relates to a system and method for wireless data transmission in an open process regime, for example a producing (or injecting) well associated with oil and gas production, the system comprising means for data acquisition, means for en data conversion, means for wireless data transmission, control means, power source, and a static pulse generation device adapted for generating static pressure fluctuations in the well fluid. The data conversion means are adapted to convert data to a simplified number format to be transmitted by the induced fluctuations in the process fluid.

24 Claims, 7 Drawing Sheets

SYSTEM AND METHOD FOR WIRELESS DATA TRANSMISSION

The invention is related to a wireless system for data acquisition and transmission in boreholes as well as a wireless method for transmitting data from devices located in borehole completions.

BACKGROUND

To optimise recovery, the oil industry depends on gathering data from wells and reservoirs. These data form the basis for nearly every decision with respect to the development and operation of an oil field, including where to locate new wells, maintenance programs and allocation/control of production.

Because of this need for data, many well applications of today are completed with permanently installed pressure and temperature monitoring devices. Most systems available in today's market require electrical supply and communication lines running the length of the downhole pipe from the wellhead down to the downhole gauge (i.e. downhole completion), usually secured by using clamps fitted onto the tubing. Fitting cables to the tubing (completion) is a time consuming activity that lengthen the installation time compared with tubing installation without downhole gauges. During the installation of traditional gauges, the cables, clamps, splices, penetrators and/or connectors are greatly exposed and are natural failure mechanisms. If damage occurs, the worst-case scenario is that the entire length of tubing must be retrieved to replace a damaged cable. If the damaged equipment is repairable downhole, a well service operation must be performed.

Other borehole devices, such as multiphase flow meters, sand detectors, valves, chokes, circulation devices (final elements), and similar are less commonly installed as part of a permanent borehole completion, but where this is the case, the same problems as described above apply.

Permanently installed data acquisition devices often suffer from a significant degree of failure, and this leads to limited obtainable information from the reservoir. This may have a serious impact on the understanding and modelling of the reservoir and reduce the reservoir recovery factor.

Due to harsh environment and high temperatures in the well, such instrumentation has limited lifetime expectancy and traditionally fails due to long-term failure mechanisms and technology misuse. Depending on the well conditions, the lifetime of this technology varies from a few months to a few years. There is therefore a need for methods and systems, which allow monitoring when the permanent monitoring systems have failed, thus regaining/maintaining the continuity of dataflow from the well. Preferably, the replacement/remedial method should be intervenable by means of well service techniques and not require re-completing the well.

Also, in particular for shallow-water and land-market oil and gas wells, cost effective alternatives to cable-based permanent instrumentation is considered very attractive. Hence, the invention and the technology can be applied both as a replacement for failed cable-based systems or as a stand-alone, preferred data acquisition solution for smaller, fairly low-producing fields.

PRIOR ART METHODS

WO 02/059459 shows an example of a system for communication employed during the drilling of boreholes in the earth for oil or gas exploration and production. The system comprises sensors for measuring parameters in wells and has a device for transferring this information to other units connected to the system (i.e. receivers). The information is modulated and transmitted as pressure pulses. This system employs a closed pipe system where the drilling fluid from the drilling operation in progress is circulated and used as transmission medium.

This and similar techniques known as "Measurement While Drilling" (MWD and/or LWD—Logging While Drilling) are based on rapid pressure pulses, generated by "pulser" devices that travel through the drilling mud by the speed of sound in a closed-loop system. MWD/LWD are used in conjunction with the drilling of the well and are not considered adaptable to producing well systems. A reason for this is that producing wells contain free gas, which prevents the MWD/LWD methods from being applicable in a reliable manner, as signals are excessively dampened in the gas phase. MWD/LWD techniques comprise transmitting signals through a fluid (drilling mud) that is pumped into the drill pipe during the drilling process, i.e. the transmission medium can be "trapped" between the surface pumps and a device modulating the circulation of the drilling fluid, i.e. operating in a closed-loop configuration in most known applications. Also, for MWD/LWD processes, the fluid column (drilling mud) is a continuous medium throughout the process line of signal transmission and the well is not producing during MWD/LWD. However, for underbalanced drilling scenarios, some well/reservoir fluid is permitted to flow into the borehole during drilling, but this inflow pattern deviates significantly from the commercial production case.

Also, alternative wireless systems based on acoustic and/or electromagnetic principles are known to exist. However, these are characterised by a limited transmission range and an increasing power demand as a function of signal transmission distance, hence limited lifetime. Also, these techniques could face problems in completions that include features such as expansion joints, PBR devices, packers, highly conductive fluids and noisy production lines as these carry the potential to attenuate, deteriorate or destruct the wireless signal between devices.

THE OBJECT OF THE INVENTION

The object of the invention is to provide a system for wireless data acquisition and transmission in a well and a wireless method for transmitting data from the well that can be installed before as well as after start of production and where the transmission of data is performed without significant interference with the production process in the well (such as recompletion).

The object of the invention is achieved by means of the features in the patent claims.

The Invention

The system according to the invention comprises means for data acquisition, means for data conversion, means for wireless data transmission, control means, power source, means for installation/retrieval, means for anchoring, means for vibration control and a static pulse generation device adapted for generating static pressure fluctuations in the well fluid. In addition, a surface signal receiver and interpretation/reporting system is part of the invention.

A major difference from MWD/LWD techniques is that the invention applies static pulses of which time intervals equals or exceeds the time constant for the producing well system, while the MWD/LWD systems applies short "events" which propagate in the drilling mud with the speed of sound. As mentioned above, can these short "events" not be used in a producing well due to the gas content which will degrade the signal and make it impossible to interpret.

Data Acquisition

Data acquisition may be achieved by means of traditional sensor technology designed in order to monitor the parameter of interest, for example quartz sensors to monitor downhole pressure and temperature.

Data Conversion

The means for data conversion convert the measurements obtained to an integer value or similar simplified number representation. This is done to simplify the transmission of the data and to increase the rate of data transmission due to relatively high resolution and complexity of raw measurements. This is a kind of data-compression technique, pre-processing data into a preferred small-sized format particularly adapted for transmission over a relative low bandwidth communication link. For example can data from downhole sensors be converted to an integral number representing the measurands and then be transmitted, or be transmitted as a direct letter representing raw data or an engineering unit.

Data Transmission

The data transmission means creates a message format of the converted data to be transmitted by static pressure pulsing. The number generated by the data conversion means may be modulated for transmission by any coding or modulation techniques, for example utilizing a DPSK (Differential Phase Shift Keying) modulation technique, resulting in good transmission efficiency and low error rates.

In one preferred embodiment of the invention, the data is transferred by use of base band transmission. Base band transmission is an efficient method for transmission through a limited bandwidth link. It is thus suited for data transmission in e.g. a process pipe. Base band transmission uses no carrier frequency modulation, but the data are transmitted directly as pulses in the well fluid. Because there is no modulating/demodulating circuitry, the data transmission means may be less complex and thus suited to a low-bandwidth link.

Control Means

The control means may be a separate unit or may be an integrated part of e.g. the data transmission means. In one embodiment, the means for data conversion, data transmission and control may be integrated in one unit. The control means control the system. The control means may e.g. be programmed to log data at a certain sampling rate for transmission to the receiver or the control means may include processing means to be able to perform simple processing, such as calculating the mean value of the sensors over a certain time period for transmission of the mean value only or other desirable operations. The control means may be adapted to receive and respond to instructions transmitted from another location, such as from a control system outside the well and may in some applications be adapted to receive and forward signals from other signal sources or other similar systems.

System Power

The power source may be self-powering means that generates power from such as the flow (e.g. propeller and turbine or similar arrangement), vibrations, and/or temperature of the process. Alternatively, seawater batteries using the annulus fluid as the electrolyte, annular generators (turbines) powered by pressure surges from surface, radioactive power generators. Examples of such self powering devices are described in U.S. Pat. No. 3,970,877 (piezo-electric element bonded to a membrane), U.S. Pat. No. 6,253,847 (using seawater in a battery with the production string as cathode, a dissimilar metal as anode and the annulus fluid as electrolyte) and US-application 2000/0040379 (vibrations in fluid flow). In a preferred embodiment of the invention, a power source (generator) is combined with a re-chargeable battery and/or super capacitor in order to provide energy to the system for prolonged periods of time.

Alternatively the power source may be non-renewable power storage such as a battery or other suitable power sources in the well. An important feature of the invention is expectedly low power consumption and hardly any increase in such as a function of signaling distance. This is a significant difference from alternative wireless communication systems proposed for the same application.

In another embodiment, the non-rechargeable battery cell is replaceable by means of well intervention methods. In further embodiments, a re-chargeable battery cell and/or super capacitor device is combined with a power generation module.

Installation and Retrieval

The means for installation and retrieval are standard means existing in the industry today and the system is installed in the well using techniques such as those known in this technical field as electric-line, slick-line, coiled tubing or tractor operations. These are all devices, tools and methods for placing, logging or maintenance operations in wells and related process systems. The static pressure pulse communication system may be adapted for installation into the well subsequent to the installation of the completion/process system in the well. However, it can also be installed as a part of the completion string, i.e. as an integral part of the production pipe by means of screwed thread attachments.

Anchoring

The system is in a preferred embodiment of the invention attached in the completion by means of the anchoring device (alternatively, it is threaded onto the tubing in a permanent installation). The anchoring device may be any suitable device adapted to attach a device to the well. The anchoring device may be adapted to fit into existing anchoring arrangements in the well. In one embodiment, the system interfaces towards known commercial anchoring devices, such as packers and gauge hangers and tubing pipe threads (the latter applies for permanent installation). In another embodiment, anchoring is an in-built function in the system.

For the case of using a gauge hanger or analogue anchoring device: This relates to the case where the pulse generating device is a centered device that creates a pressure surge in the wellstream by means of expanding into the annulus between the tool body and the tubing wall.

For the case of using a packer or analogue anchoring device: This anchoring system comprises a seal towards the pipe wall of the tubing in order to lead the well stream through the tool body, in order to generate pulses by an internal choke design.

Hence, the packer provides for flow diversion, i.e. it gates the process flow through the static pulse generation module of the apparatus.

In one embodiment, a permanent installed system body with threaded connections to the production tubing for permanent installation is combined with retrievable system components, either retrievable as a whole, or on a component-by-component basis.

Vibration Control

In one embodiment, a vibration-reducing module is included in the system. Typically, this is located at some distance from the anchoring device, in order to reduce tool vibrations that can damage delicate components. In one embodiment, the vibration-reducing module is a commercial centraliser device, alternatively a commercial gauge hanger or packer with a stinger assembly in order to prevent the "tail" of the system from vibrating. In another embodiment, the vibration is controlled by means of an in-built camming device that forms part of the system.

Static Pulse Generation Device

The static pulse generation device is a device adapted for generating static pressure fluctuations in the well process system. By definition, static hereby means pressure changes within the process system in the time domain equal to or beyond the time constant of the process system as defined later in this document. The apparatus incorporates a movable restriction device (final operator or device) or other device, which is capable to change the flow of the production fluid in order to create a pressure drawdown or build-up (i.e. static pulse) within the process system.

This means that for producing wells with a low gas-to-liquid ratio, the static pulse generation device may comprise elements for altering the pressure of the well fluid more, e.g. by means of pressure pulses travelling by the speed of sound in the fluid of interest.

Examples on applicable devices may be nozzle valves, needle valves, solenoid valves, gate valves, slide valves, rotating disc valves, globe (ball) valves, modulating flow restriction (umbrella device), cascade chokes, plug-and-cage chokes, sleeve-and-cage chokes (external/internal), sleeve and seat, needle and seat, and similar, operated by an actuator.

The actuator may output any linear or non-linear, longitudinal, twisting/rotation or combination movement. The flow restrictions may be anchored directly on the inner walls of the process system so that a centred process flow is modulated, or the restriction may be a centred device in the process tube and thus modulating an annular or surrounding process flow. The actuator may be electric operated, hydraulic operated, thermal operated or a combination of such, such as electro-hydraulic operated. The pulse generation device may comprise one or several of the mentioned devices in parallel or series. The static pulse generation device is controlled by the control means.

In an alternative embodiment of the invention, flow modulations (i.e. surface readings) rather than pressure modulations (i.e. surface readings) are utilised for signal transmission and receiving purposes.

Fail-Safe Overriding Device

A fail-safe overriding system may be provided, which ensures that the pulse generation device goes to a "passive" mode should the energy supply or any other system component fail to operate. By "passive" it is meant that the pulse generation device returns from whatever state it might have at the occurrence of a failure, back to the original position, where a minimum choking effect is imposed on the well flow. The intention of the fail-safe overriding system is to avoid the apparatus getting permanently locked in "active" position where it imposes a choking effect on the well system. This can be essential in cases where removal of the data transmission system and/or the pulse generating device cannot be performed shortly after the occurrence of a failure to ensure that production can be maintained even if the data transmission is discontinued.

In one embodiment of the invention, the fail-safe function is in the form of a spring that is compressed by the actuator when in operational modus. Here, the actuator goes into "neutral" mode in the case of power failure, whereupon the spring returns the choke position to the original.

In a preferred embodiment of the invention, the fail-safe mechanism is in the form of a spring that is compressed by the actuator when in operational modus. In this case, the actuator is held in locked position by a dedicated device when non-operational. In case of a power failure or other system failure, the actuator-locking device brings the actuator from locked to neutral position, whereupon the spring returns the choke position to the original. The benefit with this arrangement is that it does not draw excessive power in order to hold the fail-safe spring compressed when in operational (choking) modus.

Surface Signal Receiver and Interpretation System

In general, the system will utilize the pressure sensors that already are in place in the wellhead (with associated computer hardware) to record the pressure pulses from the downhole telemetry system. In addition, a separate computer may be supplied together with the system, or alternatively software can be installed into existing computers associated with the well of interest. However, the surface system might also comprise pressure or alternative sensors that are installed in conjunction with the downhole system installation—for that specific purpose.

In one embodiment, signals are extracted from the existing Data Acquisition System (DAS) associated with the oilfield of interest. Data can be collected from the existing DAS that has been put in place for receiving data from the wellhead pressure sensors. This collection can be obtained by installing dedicated software, or by linking a separate computer to the existing DAS. This will monitor the pressure profile at the wellhead and extract data from the pressure fluctuations as defined and modulated in the time domain. In this way, one is provided with relevant data from the retrofit sensors downhole.

In another embodiment, the signals are acquired by bypassing the existing Data Acquisition Systems (DAS). A separate computer with the necessary software and interfacing can be connected to the communication link between the wellhead pressure sensor and the existing DAS. In this way, the pressure data is continuously monitored, and the pressure pulses are identified, by an independent DAS.

For an application where new surface sensors are supplied as a part of the installation, the same independent DAS will be used to read and interpret data.

Typical Application and Operation

The static pressure pulse system will typically be used when ordinary sensors in the well fails during production. Alternatively, the system may be installed before start of production. The sensors perform the desired measurements. The measurements may be performed continuously or in intervals. The data from the sensors are then converted to a simple binary number (or similar code representing the raw data or an engineering unit) by means of the data conversion means, and the static pulse generation device generates fluctuations in the well fluid, which represents the binary number (or equivalent). The fluctuations in the well fluid will then be detected by detecting means located on surface, on the seabed or any other location on or in the process system.

The well fluid which constitutes the medium for generation of static fluctuations is the regular stream/flow of the well. The system may thus be adapted for installation and operation in wild flow process, i.e. an open process. In this case the static fluctuations may be superimposed on the flow in the open process/wild flow.

Initialisation

The system will preferably be initialised after installation, but before start of operation. This initialisation is performed by recording the time delay from the generation of the fluctuation in the fluid to the detection of the same fluctuation at the receiver station. This time delay gives a time constant that is used in interpreting the received signals. Typically, the downhole module will be programmed to initially transmit pulses at a pre-defined rate and a given pulse period during the start-up. The response curves will be monitored to tune the surface receiver according to the process time constant (described later in this document) and pressure response.

Adaptive System

The downhole system module may be designed to be adaptive control means, meaning that the pressure sensor is located downstream the pulse generator and used in order to monitor and control the pulse transmission in a closed-loop configuration. Hence, an internal interrogation protocol utilises the feedback from the pressure sensor to adjust the choke position in order to enable an optimal pulse phase, length, and amplitude in time domain that matches the process system.

Throughout the lifetime of the system, typically the downhole or active transmitter will tune according to the process system time constant and change the characteristics of the start pulse enabling the receiver device to calibrate amplitude and phase to the actual signal transmission rate. The reason for this is that oil reservoirs deplete over time, hence the fluid composition, flow rate, pressure states and consequently the time constant for a well of interest might change as a function of time.

This is not an issue in the prior art MWD/LWD techniques, as these are performed in a closed system where the fluid flow rates are fully controlled by the operator and where the fluid flow does not comprise gas fractions.

Possibilities for Extension to Two-Way Wireless Communication

In one embodiment, the system may also comprise detection means in the downhole module as well as modulating means in the surface module. This is of particularly interest when there is a need for two-way communication.

BRIEF DESCRIPTION OF FIGURES

The invention will now be described in more detail by means of examples with reference to the accompanying drawings.

FIG. 1 shows an example of the system 10 according to the invention after installation in a well/production tubing 11. The static pulse generation device 20 comprises in this example several blades 17 which may be moved in and out with respect to a centre axis and thus constituting a variable restriction of the production flow.

Figure 1:
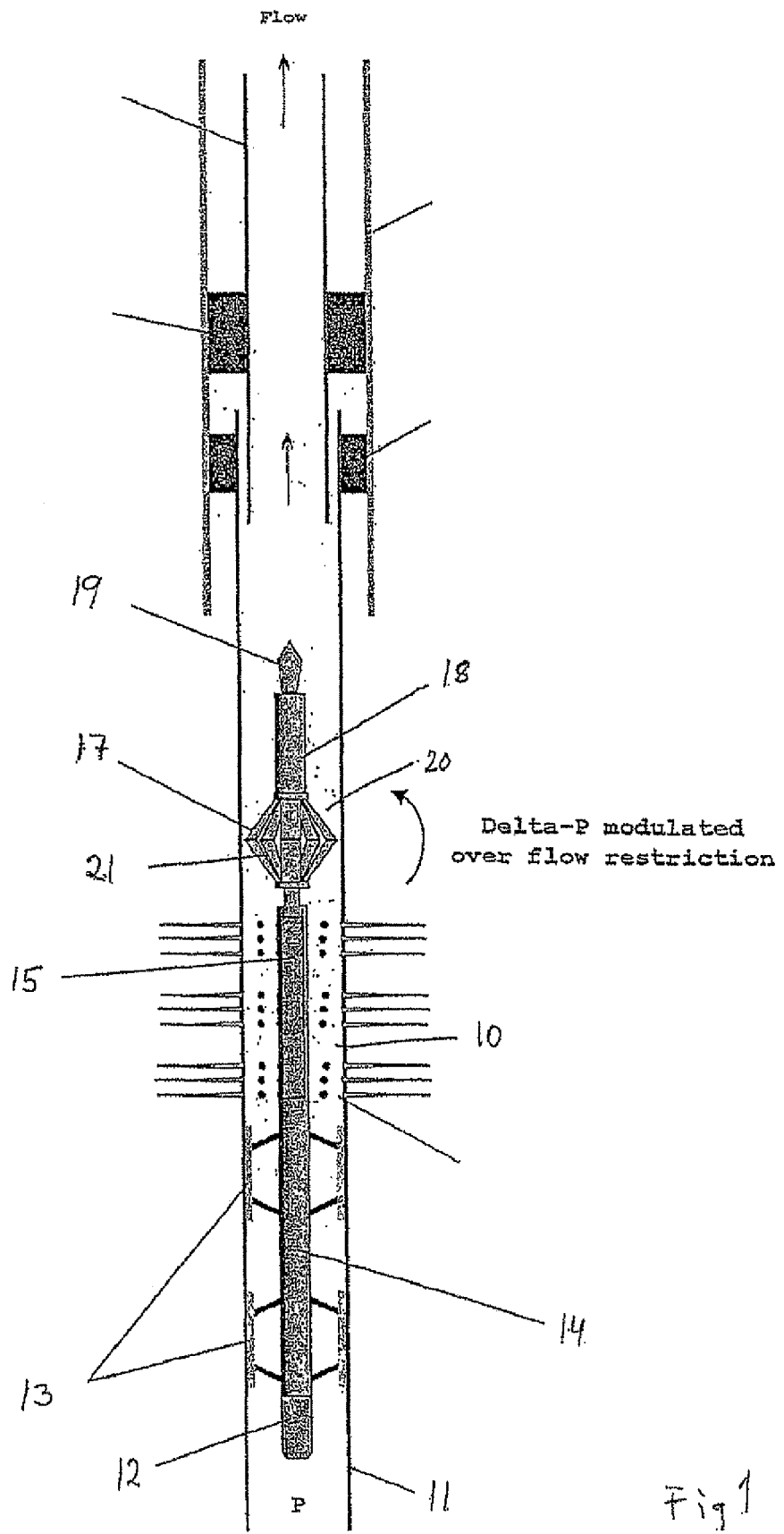
FIG. 1 shows an example of a system according to the invention after installation in a well.

Connected to the static pulse generation device, is a in-flow kinetic generator 21 which is a vibration element for generating electric power for driving the system The energy generated in the generator 21 can be used directly to feed the instrument and its variable flow restriction (i.e., volume flow restriction) or indirectly by charging a secondary energy source 15 located in connection with the static pulse generation device.

A signal modulator 18 is also connected to the static pulse generation device 20 for actuating the static pulse generation device 20. Connected to the top of the system is a fishing head 19. The fishing head 19 is a device for use when installing or retrieving the system from the well and is adapted to fit with regular installations/retrieval means.

The anchoring device is in this example comprised of camming devices 13 which expand towards the sides of the wall to trap the system in the well.

In the lower end of the system 10, are the sensors 12 located. The sensors 12 will often be pressure and temperature (PT) sensors, e.g. quartz sensors. The system control module 14 is here located between the camming devices 13.

Figure 2:
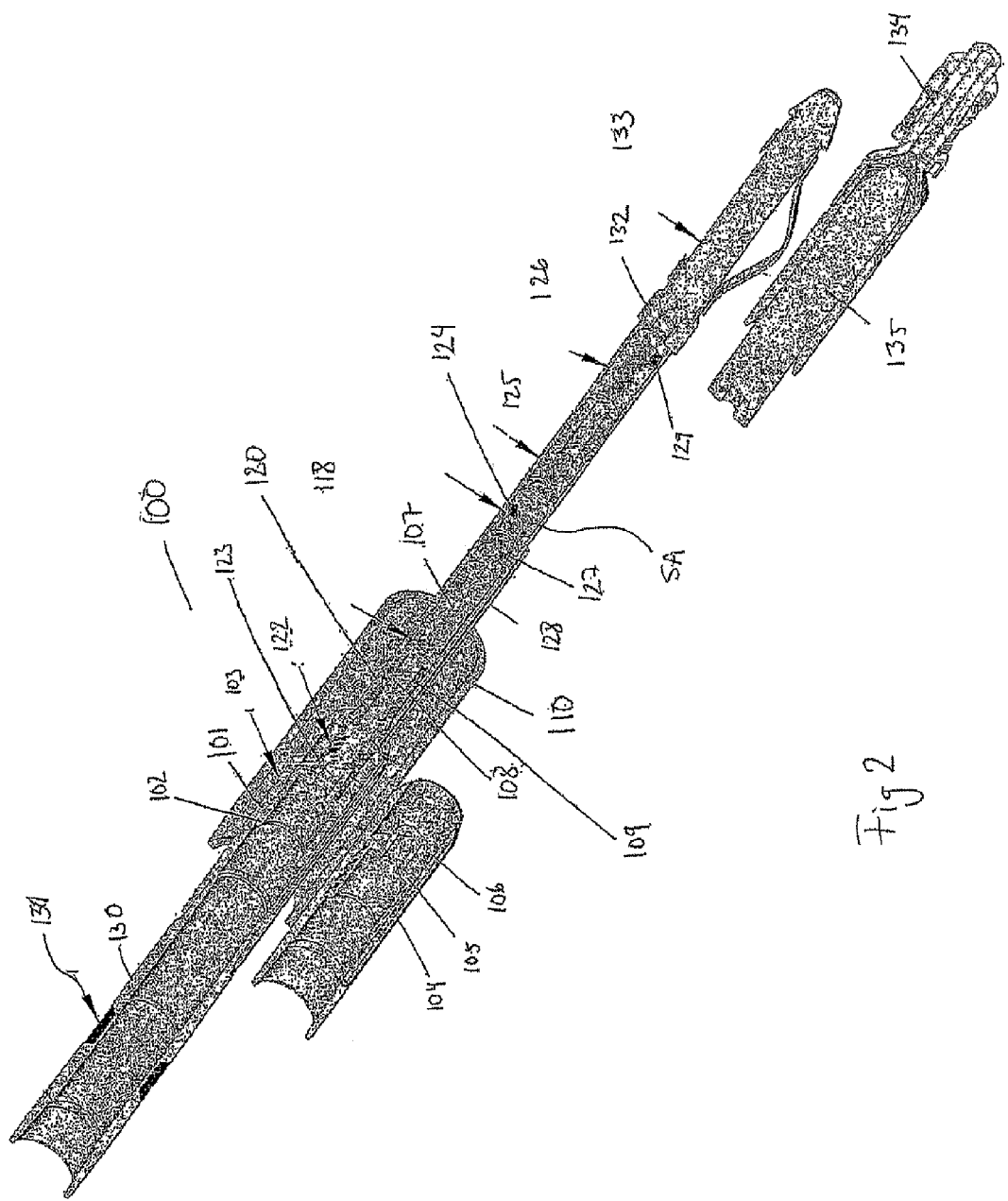
FIG. 2 shows another example of a system according to the invention after installation in a well.

FIG. 2 shows another example of a system 100, according to the invention after installation in a well/production tubing 110. The static pulse generation device 120 comprises in this example a cage-and-sleeve choke 101. The sleeve 102 in the cage-and-sleeve choke 101 can be linearly adjusted in order to reduce/increase the overlapping flow area defined by the ports 103. When the equivalent port size 103 is reduced, increasingly rapid, oppositely directed fluid jets meets in the centre of the tool, whereupon a turbulent pressure loss is achieved.

Alternatively, to replace the cage-and-sleeve choke 101, a cascade type choke 104 can be utilised. The inner mandrel 105 of the cascade choke 104 can be adjusted relatively to the outer mandrel 106. By doing so, the cascade profiles of the inner mandrel 105 and the outer mandrel 106 are linearly displaced with respect to each other. The cascade choke 104 is originally aligned in order for fluid to pass with little or no choking at all. Upon activation, the cascade profiles of the inner mandrel 105 and the outer mandrel 106 become aligned in a manner where an increasingly large pressure drop is achieved across the cascade choke 104. The main contributor to the pressure loss is turbulence according to numerous changes of state from high velocity to lower velocity and vice versa as the flow passes the cascade profiles.

The actuator module 118 operates the chokes 101 and/or 104. An electric motor 107 linearly moves the yoke 108 back and forth in order to operate the chokes 101, 104. The motor 107 is placed in an oil bath. The motor chamber is compensated to process (wellbore) pressure by means of a bellows arrangement 109. This bellows arrangement 109 also prevents process fluid to enter the motor chamber and cause malfunction of the motor 107.

A fail-safe mechanism 122 ensures that permanent choking of the process system is prevented should any system component fail. The actuator module 118 compresses the fail-safe spring 123 during the choking of the process flow. During this process, the electric motor 107 is energised in order to maintain the required choking. Should system energy supplies fail, the electric motor 107 will loose its power and the fail-safe spring 123 will return the choking of the process flow to neutral, i.e. no choking.

Alternatively, the fail-safe mechanism 122 will comprise a motor locking device 124 in addition to the fail-safe spring 123. The motor locking device 124 is preventing the electric motor 107 from entering neutral position during the choking of the process flow. The intention with the motor locking device 124 is to save energy by not having to keep the motor 107 energised throughout the choking process, but rather use a low-energy consuming locking device 124. Should the system energy supplies fail, the motor locking device 124 will bring the motor 107 into neutral modus and the fail-safe spring 123 return the choking condition of the well process to neutral.

The sensor assembly SA, an electronics module 125 and a battery/energy module 126 will be housed in atmospheric chambers that are protected from process pressure by means of pressure bulk heads 127. A sensor tube 128 is used to read pressure downstream the pulse generation device 120. This is a hydraulic line connection between the pressure sensor assembly SA and a point downstream the pulse generation device, and an important feature in order to make the system adaptive.

An energy generation device, indicated by the box 129, can be included in order to make the system 100 fully autonomous, i.e. self sufficient with energy for prolonged periods of time.

A packer 130 is used to attach the system 100 to the well/production tubing 110. The packer element 131 creates a seal towards the tubing wall that the well/process fluid cannot pass. Hence, the fluid flow is diverted into the pulse generation device 120 and the respective choking modules of interest.

A vibration control module 132 is included in the lower end of the system 100. This could be a commercial centraliser 133, alternatively a commercial gauge hanger 134 with a stinger system 135 between the system 100 and the gauge hanger 134.

Figure 3:
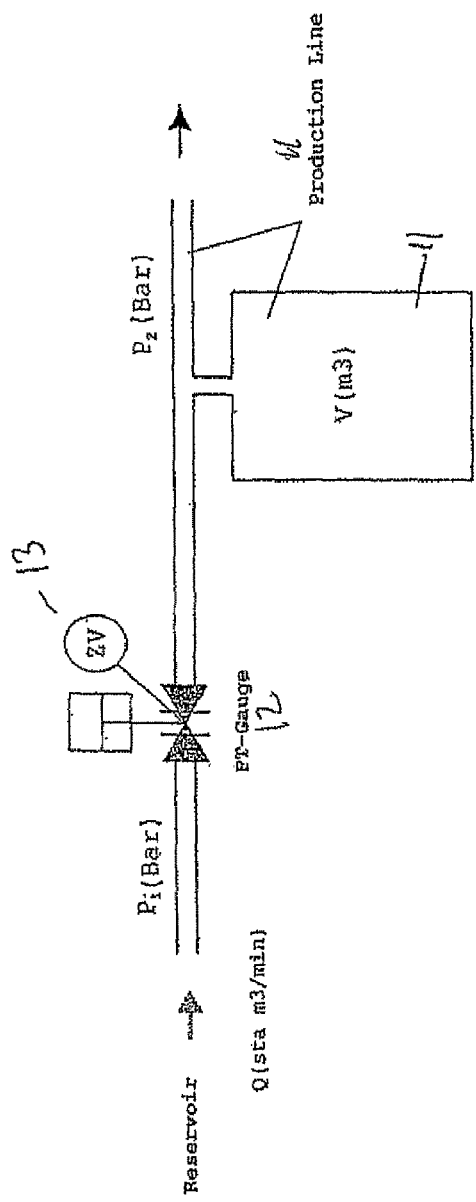
FIG. 3 shows a simplified block diagram of the flow line and refers to the time constant of the process flow.

FIG. 3 shows a simplified block diagram of the flow line characterized by the properties of the process pipe. A fluid volume 11 represents the production line and a PT-gauge 12 is providing the signal to be transferred. A state variable restriction 13 is integrated with the PT-gauge and provides the fluctuations in the process flow for transferring the signals. The fluctuations are, in this example, pressure fluctuations. P1 is the upstream pressure, i.e. the pressure at the inlet/near the PT-gauge, and P2 is the downstream pressure, i.e. the pressure at the outlet/near the location to receive the signals.

The flow line (production line) is a complicated dynamic system, but may be approximated by a single linear lag plus a distance-velocity lag. This model assumes infinite source capacity from the reservoir and a negligible end volume.

$$T = RC = \left(\frac{P_1 - P_2}{Q}\right) \cdot \left(\frac{V}{P_1 - P_2}\right) \text{ [min]} \quad [1]$$

Where T is the time constant of the system, R represents the resistance in the system, C is capacitance, Q is flow rate, and V is the volume 11.

In summary, the characteristic time constant depends on the composition of the fluid, the fluid's upstream resistance against movement in the process line, and the bulk volume of the fluid flow (process flow).

A major difference from MWD/LWD techniques is that the invention applies static pulses of which time intervals equals or exceeds the time constant of the inherent process system as described by equation [1].

Figure 4:
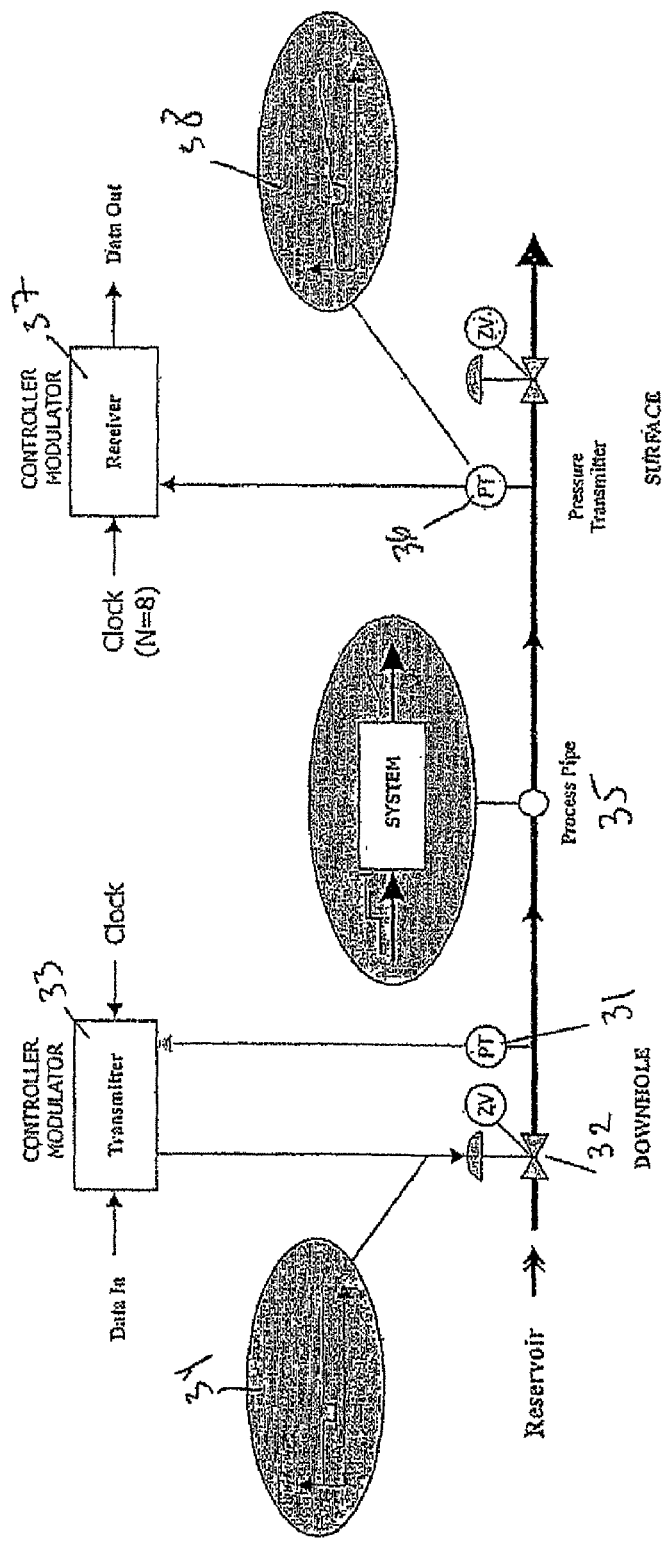
FIG. 4 shows a schematic diagram of a pressure pulsed data communication link where data is transmitted from an instrument located in a borehole to a surface receiver.

FIG. 4 shows a schematic diagram of a pressure pulsed data communication link according to one embodiment of the invention. A PT-gauge 31 is measuring the pressure and temperature in the well, and this measurement is processed in the means for data conversion and means for data transmission, here represented as the common process 33. The process results in a signal sequence 34 to be transmitted. This signal sequence is transferred to a pulse generation device 32, which generates a pressure pulse in the process flow 35 in the process pipe from the reservoir. The pressure pulse propagates through the process pipe and is picked up by a PT gauge 36 whereupon it arrives at a receiver station 37 where it is detected as the signal sequence 38. The receiver station may comprise means for processing the signal sequence 38 to achieve the actual measuring values from the PT-gauge 31.

As the transmitted signal sequence, for example a direct binary format or a standard character text format (such as ASCII) may be used. In addition may one or more control bits or characters for controlling the transmission be included in each signal sequence. For example can the pressure value 561.4 [bar] be represented as 5641 as four individual bytes, corresponding to the binary number 1 0101 1110 1110. As the data word format will be known both in transmitter and receiver, only the integers are represented in the signal sequence. In addition, start, stop, and control bits may be added to the sequence.

In the transmission of the signal sequence, important issues are synchronization and line coding.

The synchronization is important to supply timing information to the receiver to make the receiver able to recognise the individual bits of the signal. If the receiver clock is running at a rate different from the transmitter clock, or if there is an offset between the two clocks event when they are running at the same rate, the bits will not be recorded correctly.

Figure 5:
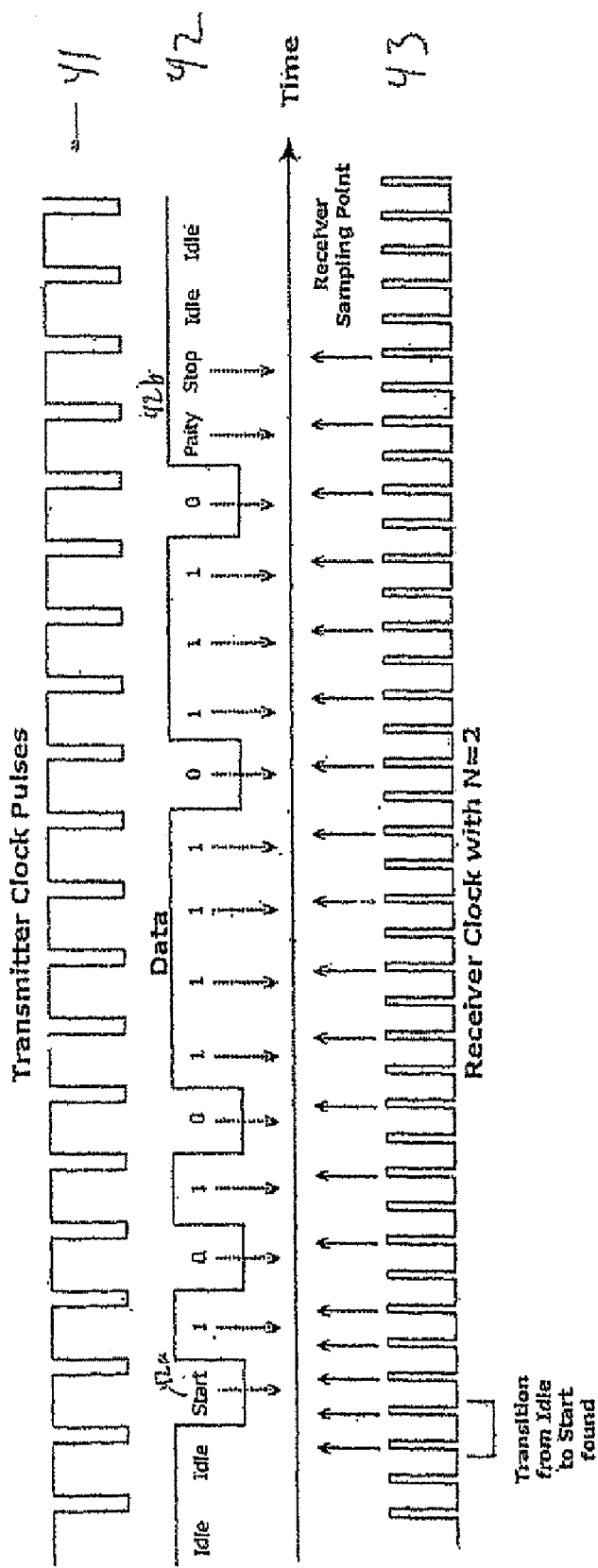
FIG. 5 shows a pulse diagram with an example of a signal transmission/coding scheme.

FIG. 5 illustrates an exemplary pulse diagram for the data transmission. Data is transmitted using a 16 bit format. The content of the frame is the binary format or representation of 561.4 as discussed above. In this example, asynchronous transmission is used. The signal sequence 42 starts with a start bit 42a, and ends with one or two stop bits 42b. The receiver will wait for the start bit, here a transition from "high" to "low". This triggers the sampling of the signal, the sampling rate 43 in this example is 2 times the transmitter clock rate 41, but more precise reception of the signal may be achieved by using a higher sampling rate. The stop bit returns the transmission line (process flow pressure) in "high", which enables the recognition of the next signal sequence.

Figure 6:
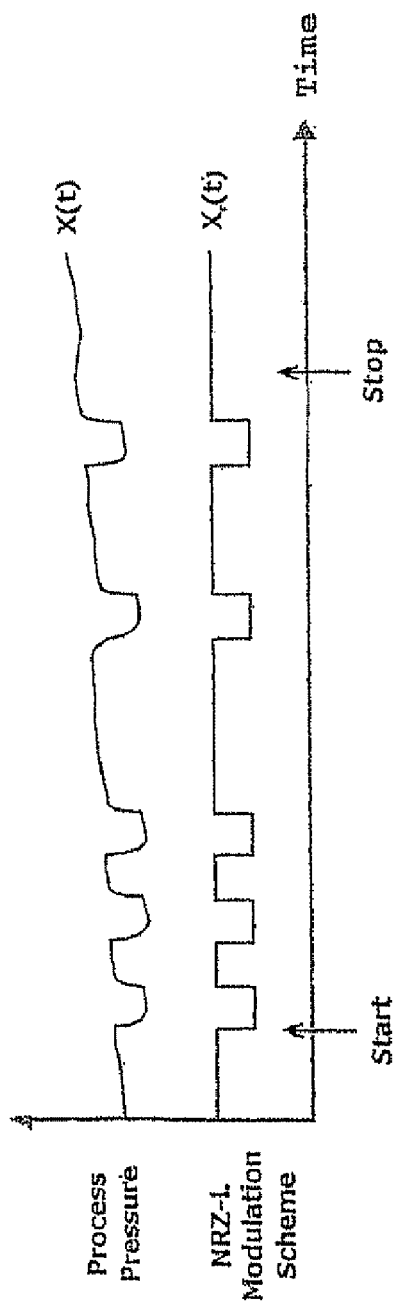
FIG. 6 shows an example of system response at the receiver station at surface to actuator input (downhole).

Line coding is used for generating special types of pressure pulse sequences to assist the synchronisation and match the characteristics of the transmission line. Different types of line codes may be used, for example the "non-return to zero" (NRZ) method as illustrated in FIG. 6. The NRZ is a simple scale and level shift of the waveform representing the signal sequence using the pulse with correspondence to the bit interval, with no "gaps" between adjacent pulses. FIG. 6 illustrates the resulting process reaction when applying NRZ-L (non-return to zero-level) signal modulation.

Figure 7:
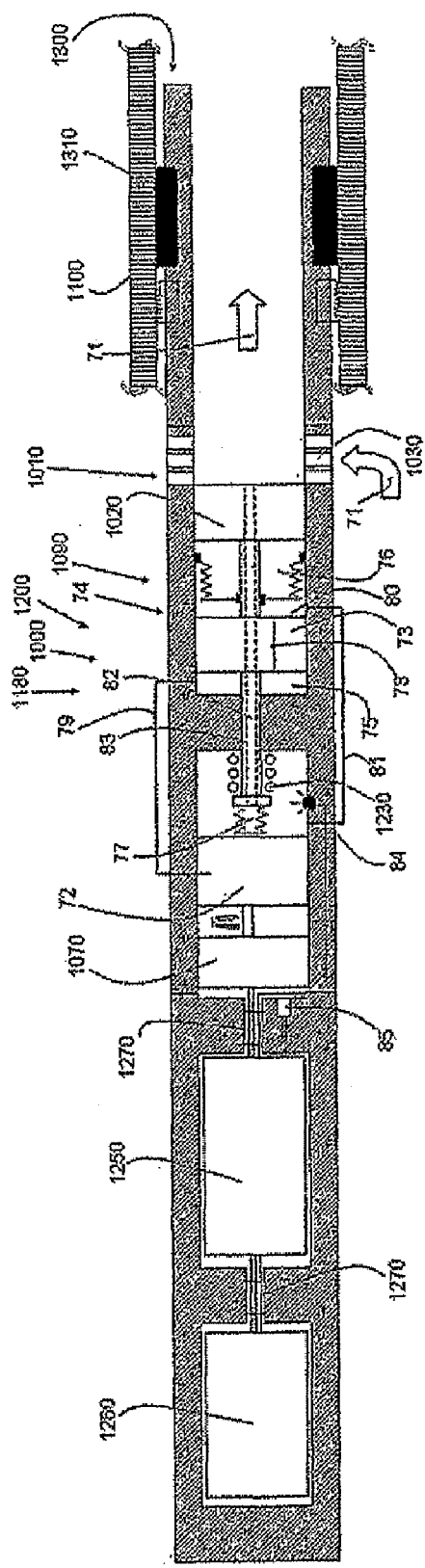
FIG. 7 shows another embodiment of a system according to the invention after installation in a well.

FIG. 7 shows a preferred embodiment of a system 1000 according to the invention. The tool is attached to the well/production tubing 1100 by means of a packer 1300. The static pulse generation device 1200 comprises a cage and sleeve choke 1010. The packer sealing element 1310 forces the fluid flow 71 through the ports 1030. Adjustment of the sleeve 1020 of the cage and sleeve choke reduces (alternatively increases) the ports 1030, hence the degree of choking of the production well.

The actuator module 1180 operates the choke 1010. An electric motor 1070 operates a pump 72 which again is used to work on a piston 73 which again operates the sleeve 1020 of the sleeve and cage choke 1010.

The motor 1070, pump 72, and piston system 74 (with the exception of the high pressure side 75 of the piston 73) are all placed in an oil bath that is compensated to process (wellbore) pressure by means of a bellows arrangement 1090 comprising a displacement bellows 76 and a compensation bellows 77. The displacement bellows 76 does, in addition to pressure compensation of the system, function as a dynamic seal between the inside the actuator module 1180 and the wellbore. The compensation bellows 77 is used to keep volumetric balance inside the actuator module 1180 when operating the pump 72. This is achieved by means of communication between the well flow and the compensation bellow through the compensation conduit 82 of the actuator shaft 83.

In order to perform a choking action, the pump 72 pumps oil through a high pressure conduit 79 and into the high pressure side 75 of the piston 73, which causes the piston 73 and consequently the sleeve 1020 to move to the right on the drawing. Liquid is sucked into the pump from the oil reservoir of the actuator module 1180, which also is in full communication with the low pressure side 80 of the piston 73 through the low-pressure conduit 81. Running the pump 72 in reverse will make the piston 73 and consequently the sleeve 1020 to move to the left on the drawing, back to a no-choking, original position.

The fail-safe mechanism 1220 ensures that permanent choking of the process system is prevented should any system component fail. The fail-safe mechanism comprises the fail-safe spring 1230 and a piston nozzle 78. When in a choking modus, the fail safe spring 1230 will force hydraulic oil to seep from the high pressure side 75 to the low pressure side 80 of the piston 72 through the piston nozzle 78. Hence, over time, the sleeve 1020 will move to the left on the drawing, back to a non-choking position. This movement is too slow to alter the choking process, but sufficient for fail-safe purposes.

A position indicator 84 is used to track the exact piston 73 position, to compensate for the fact that the piston is moving due to the fail-safe mechanism 1220. In a preferred embodiment of the invention, the pump 72 is of a hose-pump type. This makes the pump 72 and motor 1070 assembly independent of the position of the piston 72, and the choking process can be controlled by means of feedback from the position indicator 84. Also, this pump 72 and motor 1070 assembly enables a simple and reliable mean for pumping fluid in both directions without the need for check valves, pilot valves and related equipment that will complicate the system 1000. However, in other embodiments of the inventions, such check valves and pilot valves may be part of the system 1000.

A battery module 1260 and an electronic module 1250 are used to energise and control the operation of the system 1000. Pressure bulk heads 1270 are utilised to protect the battery module 1260 and an electronic module 1250 from process pressure.

The system pressure sensor 85 is placed inside the reservoir of the actuator module 1180. This ensures that the pressure sensor 85 is protected from the outer environment. In a preferred embodiment of the invention, the pressure sensor 85, in conjunction with the programmed functions of the electronic module 1250 is used to ensure system adaption to changes in the process system, caused by process fluid properties, a decline in well production, or other factors.

The invention claimed is:

1. System for wireless transmission of data in a producing or injecting well associated with oil and gas production in which a well fluid flows therethrough, the system comprising:
    means for data acquisition,
    means for data conversion adapted for converting the data to a simplified number format,
    means for wireless data transmission,
    control means,
    a power source, and
    a static pulse generation device adapted for generating static pressure fluctuations in the well fluid by applying the static pulses with a time interval there between which equals, or is greater than, the time constant of the process system as defined by Equation 1:

$$T = RC = \left(\frac{P_1 - P_2}{Q}\right) \cdot \left(\frac{V}{P_1 - P_2}\right)$$

where T is the time constant of the system, R represents the resistance in the system, C is capacitance, Q is flow rate and V is the volume of the fluid wherein the static pressure fluctuations in the well fluid represents the simplified number.

2. System according to claim 1, characterised in that the system comprises a fail-safe mechanism.

3. System according to claim 1, characterised in that the parameters of the static pressure fluctuation are changed in an adaptive process.

4. System according to claim 2, characterized in that the static pulse generation device is a choking device, and the fail-safe mechanism is in the form of a spring that is compressed by an actuator when in operational modus, the actuator turning to "neutral" mode in the case of power failure, whereupon the spring returns the choke to an no choking position.

5. System according to claim 2, characterised in that the system comprises a pump working in conjunction with a piston associated with a leakage nozzle system.

6. System according to claim 5, characterised in that the pump is a hose-pump.

7. System according to claim 1, characterised in that the system includes a piston indicator adapted to track a piston position.

8. System according to claim 1, characterised in that that the regular stream/flow of the well fluid constitutes the carrier for the data to be transmitted.

9. System according to one of the preceding claims, characterised in that the static pulse generation device comprises elements for slowly altering the pressure of the well fluid.

10. System according to one of the preceding claims, characterised in that, for producing wells with a low gas-to-liquid ratio, the static pulse generation device comprises elements for altering the pressure of the well fluid more, by means of pressure pulses travelling by the speed of sound in the fluid of interest.

11. System according to one of the preceding claims, characterised in that the system is adapted for installation and operation in wild flow process.

12. System according to one of the preceding claims, characterised in that the system also comprises self-power source for generating power from the fluid flow or other relevant energy sources in the well.

13. System according to one of the preceding claims, characterised in that the system also comprises anchoring device, means for installation and retrieval.

14. System according to one of the preceding claims, characterised in that the system also comprises an anchoring device which seals towards the production pipe wall in order to lead the well fluid through the centre of the system for pulse generation purposes.

15. System according to one of the preceding claims, characterised in that the system also comprises means for permanent attachment to the production tubing.

16. System according one of the preceding claims, characterised in that a power source is combined with a re-chargeable battery and/or super capacitor in order to provide energy to the system for prolonged periods of time.

17. System according to one of the preceding claims, characterised in that the data acquisition means comprises at least one sensor located in the well for providing sensor data for transmission, and a receiver located at the surface.

18. Method for wireless transmission of data in a producing or injecting well associated with oil and gas production in which a well fluid flows therethrough, the method comprising:
    converting the data to a simplified number format, and
    generating static pressure fluctuations in the well fluid that represents the data in simplified number format by applying static pulses to the well fluid with a time interval there between which equals, or is greater than, the time constant of the process system as defined by Equation 1:

$$T = RC = \left(\frac{P_1 - P_2}{Q}\right) \cdot \left(\frac{V}{P_1 - P_2}\right)$$

where T is the time constant of the system, R represents the resistance in the system, C is capacitance, Q is flow rate and V is the volume of the fluid, wherein the fluctuations in the well fluid are detected by detecting means, interpreted as the binary number and converted to the actual sensor value.

19. Method according to claim 18 characterised in that the method initially also comprises a recording of the time constant representing the time delay from generation of the fluid fluctuation to the detection of the same fluctuation to set and control the data transmission rate in the well fluid.

20. Method according to claim 18, characterised in that the method provides an adaptive function by means of downhole pulse actuator interrogating with downhole pressure recorder in order to optimally adjust the pressure pulses for communication.

21. Method according to claim 18, characterised in that the fluctuations in the well fluid are pressure fluctuations.

22. Method according to claim 18, characterised in that
the data are sensor data received from sensors in the well, and
the data are transmitted to a receiver.

23. Method according to claim 18, characterised in that the fluctuations in the well fluid are detected on the earth's surface, on the seabed or in any other receiver station connected to the well fluid or process system.

24. Method according to claim 18, characterised in that the fluctuations in the well fluid are changes in the regular flow of the well fluid and the method is executed in a wild flow process.

* * * * *